United States Patent
Yamane

(10) Patent No.: US 12,221,049 B2
(45) Date of Patent: Feb. 11, 2025

(54) PET GUARD APPARATUS TO BE APPLIED TO VEHICLE, AND VEHICLE

(71) Applicant: SUBARU CORPORATION, Tokyo (JP)

(72) Inventor: Kazuya Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/980,745

(22) Filed: Nov. 4, 2022

(65) Prior Publication Data

US 2023/0158987 A1    May 25, 2023

(30) Foreign Application Priority Data

Nov. 21, 2021    (JP) .................................. 2021-189065

(51) Int. Cl.
  *B60R 21/16*    (2006.01)
  *A01K 1/02*    (2006.01)
  *B60R 22/10*    (2006.01)

(52) U.S. Cl.
  CPC ............ *B60R 21/16* (2013.01); *A01K 1/0272* (2013.01); *B60R 22/10* (2013.01)

(58) Field of Classification Search
  CPC ........ B60R 21/16; B60R 22/10; A01K 1/0272
  See application file for complete search history.

(56) References Cited

U.S. PATENT DOCUMENTS

| 4,834,420 A | * | 5/1989 | Sankrithi | ............... B60R 22/10 297/250.1 |
| 2008/0147280 A1 | * | 6/2008 | Breed | ..................... G01C 19/00 702/173 |
| 2008/0157510 A1 | * | 7/2008 | Breed | ..................... E05F 15/43 701/45 |
| 2009/0126638 A1 | * | 5/2009 | Bennett | ................ A01K 1/0272 119/28.5 |
| 2011/0132277 A1 | * | 6/2011 | McAtamney | ........ A01K 1/0272 119/752 |
| 2023/0202375 A1 | * | 6/2023 | Chmielewski | .......... B60P 7/135 119/403 |

FOREIGN PATENT DOCUMENTS

| CN | 217487230 U | * | 9/2022 |
| JP | 2019-146518 A | | 9/2019 |
| KR | 20200107301 A | * | 9/2020 |
| KR | 20200119578 A | * | 10/2020 |
| KR | 20200131490 A | * | 11/2020 |

* cited by examiner

Primary Examiner — Barry Gooden, Jr.
(74) Attorney, Agent, or Firm — MCGINN I.P. LAW GROUP, PLLC.

(57) ABSTRACT

A pet guard apparatus to be applied to a vehicle includes a pet guard body and a first air-bag device. The pet guard body is attachable to a vehicle compartment of the vehicle in which a pet is to be placed in such a manner that the pet guard body extends in a vertical direction in the vehicle compartment to partition the vehicle compartment into a front portion and a rear portion. The first air-bag device is attached to the pet guard body. The first air-bag device includes a pet air-bag and a pet air-bag inflator. The pet air-bag is configured to be deployed behind the pet guard body. The pet air-bag inflator is configured to be operated to deploy the pet air-bag upon contact of the vehicle.

20 Claims, 8 Drawing Sheets

| SIZE | WEIGHT | TYPE | DEPLOYMENT SETTING | |
|---|---|---|---|---|
| LARGE | --- | --- | HIGH OUTPUT | ~79, 33 |
| SMALL | HEAVY | --- | HIGH OUTPUT | |
| | LIGHT | LARGE-SIZED DOG | HIGH OUTPUT | |
| | | SMALL-SIZED DOG | LOW OUTPUT | |

PET GUARD APPARATUS TO BE APPLIED TO VEHICLE, AND VEHICLE

CROSS-REFERENCE TO RELATED APPLICATIONS

The present application claims priority from Japanese Patent Application No. 2021-189065 filed on Nov. 21, 2021, the entire contents of which are hereby incorporated by reference.

BACKGROUND

The disclosure relates to a pet guard apparatus to be applied to a vehicle, and a vehicle.

Some vehicles are provided with equipment such as harnesses or cages to enhance safety of pets loaded on the vehicles.

The harness is worn by the pet and attached to, for example, a seatbelt of a vehicle body.

The cage is a box case to accommodate a pet. The cage is disposed on the floor of an occupant compartment or on a surface of a rear-row seat. Japanese Unexamined Patent Application Publication No. 2019-146518 discloses a cage attachable to, for example, a seatbelt of a vehicle body.

Using such a harness or a cage makes it possible to enhance safety of a pet loaded on a vehicle.

SUMMARY

An aspect of the disclosure provides a pet guard apparatus to be applied to a vehicle. The pet guard apparatus includes a pet guard body and a first air-bag device. The pet guard body is attachable to a vehicle compartment of the vehicle in which a pet is to be placed in such a manner that the pet guard body extends in a vertical direction in the vehicle compartment to partition the vehicle compartment into a front portion and a rear portion. The first air-bag device is attached to the pet guard body. The first air-bag device includes a pet air-bag and a pet air-bag inflator. The pet air-bag is configured to be deployed behind the pet guard body. The pet air-bag inflator is configured to be operated to deploy the pet air-bag upon contact of the vehicle.

An aspect of the disclosure provides a vehicle to which the pet guard apparatus including the first air-bag device described above is attached. The first air-bag device of the pet guard apparatus is configured to be deployed upon the contact of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
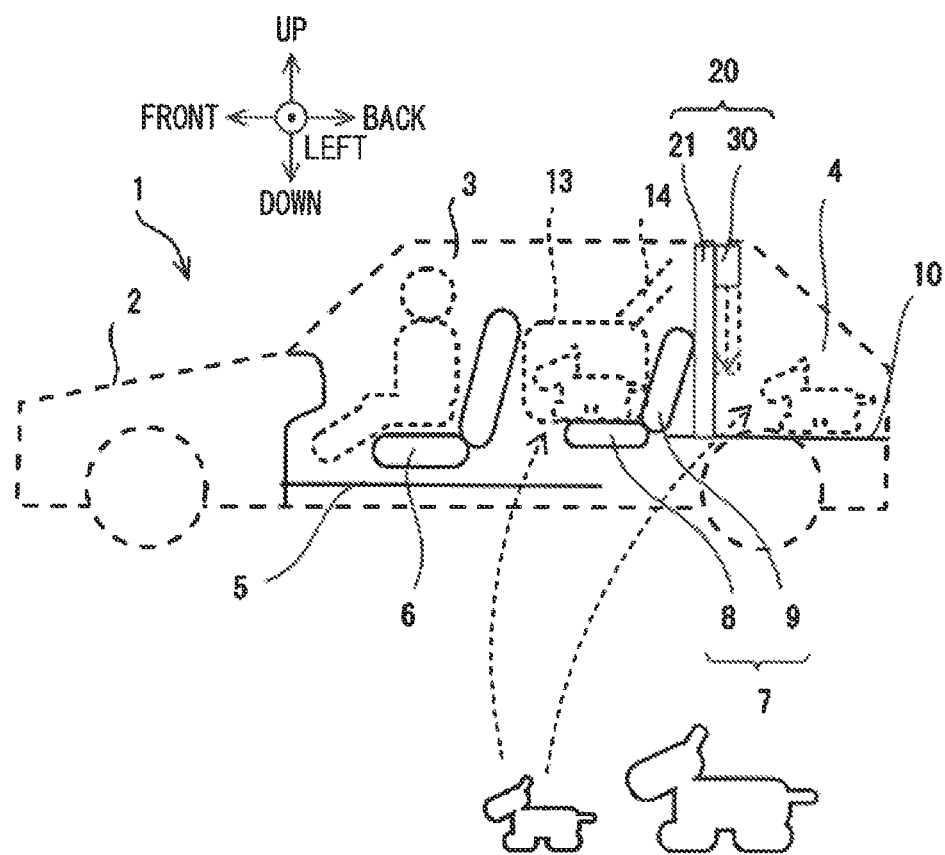
FIG. 1 is an explanatory diagram of an automobile to which a pet guard apparatus according to one example embodiment of the disclosure is attached.

A recent study has reported that safety of a pet in a vehicle is not necessarily enhanced by the use of a harnesses or a cage. The study has also reported that safety of a pet in a vehicle is not significantly enhanced even if the harness or cage is attached to a seatbelt.

According to the report, it is preferable to put a pet into a cage and place the cage in a cargo room of a vehicle in order to enhance the safety of the pet.

However, if a pet is put into a cage and the case is placed in the cargo room, the field of view of an occupant toward the cage is blocked by, for example, a seat back of a rear-row seat in an occupant compartment.

This prevents the occupant in the occupant compartment, in particular, an occupant seated in a front-row seat, from checking the state of the pet even when the occupant looks back. The occupant has to stop the vehicle, get out of the vehicle, and go to the cargo room to check the state of the pet.

Further, the pet loaded on the vehicle and prevented from seeing its owner for a long time may feel anxious.

It is desirable to provide a vehicle that makes it possible to enhance safety of a pet in a vehicle while securing convenience of an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 illustrates an automobile 1 to which a pet guard apparatus 20 according to a first example embodiment of the disclosure is attached.

The automobile 1 illustrated in FIG. 1 may have a vehicle body 2. The vehicle body 2 may include a vehicle compartment which is a combination of an occupant compartment 3 for a driver and occupants, and a cargo room 4. In one embodiment, the automobile 1 may serve as a "vehicle".

In the occupant compartment 3, a front-row seat 6 and a rear-row seat 7 in which occupants of the automobile 1 are to be seated may be arranged on a floor 5 of the occupant compartment 3 in a front-back direction.

The cargo room 4 may be provided behind the occupant compartment 3. In this example, the rear-row seat 7 may be located immediately in front of the cargo room 4. The rear-row seat 7 located in front of the cargo room 4 may have a seat back 9. The seat back 9 may extend upward from a seat surface 8 of the rear-row seat 7 to serve as a partition board dividing the vehicle compartment into the occupant compartment 3 and the cargo room 4. The cargo room 4 and the occupant compartment 3 may be communicated with each other via an opening provided between the seat back 9 of the rear-row seat 7 and the ceiling of the vehicle compartment.

Such an automobile 1 may accommodate pets, such as large-sized dogs and small-sized dogs, as well as occupants.

When being loaded on the automobile 1, a pet with a harness may be placed on the seat surface 8 of the rear-row seat 7 or on the floor 5 of the occupant compartment 3 below the rear-row seat 7. The harness worn by the pet may be coupled to a seatbelt device 57 of an occupant protection control apparatus 47 disposed in the automobile 1.

Alternatively, the pet may be placed inside a cage that is a box case to accommodate pets, and the cage may be placed on the seat surface 8 of the rear-row seat 7 or on the floor 5 of the occupant compartment 3 below the rear-row seat. The cage may be coupled to the seatbelt device 57 of the occupant protection control apparatus 47 disposed in the automobile 1.

Such a use of a harness or a cage has been considered as a safety measure to protect a pet in the automobile 1.

However, a recent study has reported that the safety of a pet is not necessarily enhanced by the use of a harness or a cage. It is difficult to effectively prevent a pet wearing a harness or accommodated in a cage from being thrown toward a front portion of the vehicle compartment upon frontal contact of the automobile 1.

The study has also reported that it is desirable to accommodate a pet in a cage and place the cage in the cargo room 4 to enhance the safety of the pet.

However, if a pet is accommodated in a cage and the cage is placed in the cargo room 4, the field of view of an occupant seated in the occupant compartment 3 toward the cage is blocked by, for example, the seat back 9 of the rear-row seat 7.

This prevents an occupant seated in the occupant compartment 3, in particular, an occupant seated in the front-row seat 6, from checking the state of the pet even when the occupant looks back. The occupant has to stop the automobile 1, get out of the automobile 1, and go to the cargo room 4 to check the state of the pet.

Further, the pet loaded on the automobile 1 and prevented from seeing its owner for a long time may feel anxious.

Thus, there is a demand for the automobile 1 that makes it possible to enhance the safety of a pet while securing convenience of an occupant.

To address such an issue, in this example embodiment of the disclosure, a pet guard apparatus 20 is used which serves as a see-through partition between the occupant compartment 3 and the cargo room 4.

The pet guard apparatus 20 includes a pet guard body 21 and a pet air-bag device 30. In one embodiment, the pet air-bag device 30 may serve as a "first air-bag device".

The pet guard apparatus 20 may be detachable from the vehicle body 2 of the automobile 1. The pet guard apparatus 20 may thus be retrofitted to the vehicle body 2 of the automobile 1 by, for example, a user.

A pet placed behind the pet guard apparatus 20 attached to the automobile 1 is blocked by the pet guard apparatus 20. This prevents the pet from being easily thrown forward over the pet guard apparatus 20.

Figure 2:
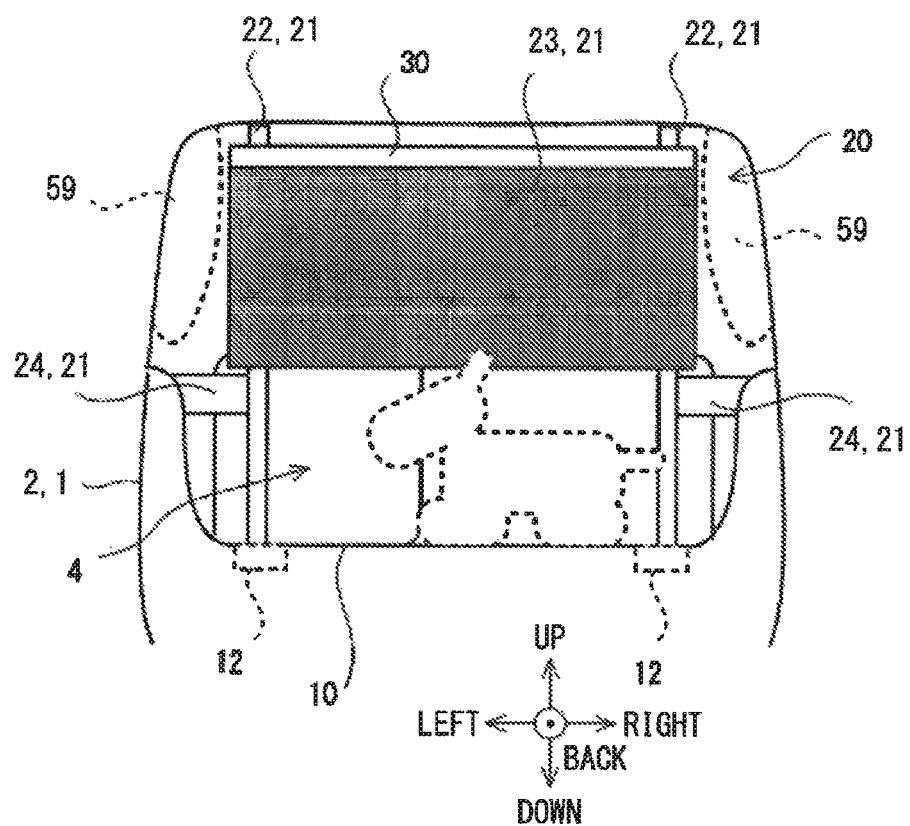
FIG. 2 is an explanatory diagram illustrating an exemplary state of the pet guard apparatus attached to the automobile illustrated in FIG. 1.

FIG. 2 illustrates an exemplary state of the pet guard apparatus 20 attached to the automobile 1 illustrated in FIG. 1.

FIG. 2 is a rear view of a part of the vehicle body 2 to which the pet guard apparatus 20 is attached.

The pet guard body 21 may include a pair of bars 22 and a mesh member 23. The pet guard body 21 may be attached to the vehicle body 2.

The bars 22 may be, for example, metal bars each having a columnar shape.

The bars 22 may each have a length enough to extend in a vertical direction from a floor 10 of the cargo room 4 to the ceiling of the cargo room 4 to which the pet guard body 21 is attached. Each of the bars 22 may be adjustable in length.

Each of the bars 22 may be a hollow column, and a wiring line coupling the pet air-bag device 30 to a control system 40 of the automobile 1 described below may extend through each of the bars 22.

The mesh member 23 may be, for example, a metal or resin mesh having a horizontally long, substantially rectangular shape. The pet in the cargo room 4 is thus visually recognizable from the front portion of the vehicle compartment through the mesh member 23. Alternatively, the pet guard body 21 may include a transparent or semi-transparent panel in place of or in combination with the mesh member 23.

The substantially rectangular mesh member 23 may have a width substantially equal to the width of the cargo room 4. Alternatively, the substantially rectangular mesh member 23 may have a width smaller than the width of the cargo room 4 so as not to cover deploying regions of side curtain air-bag devices 59 to be deployed at left and right sides of the cargo room 4.

The substantially rectangular mesh member 23 may have a height at least greater than or equal to the distance between an upper edge of the seat back 9 of the rear-row seat 7 to the ceiling of the vehicle body 2. Alternatively, the mesh member 23 may be adjustable in width and height when being attached to the vehicle body 2. In this case, the mesh member 23 may include a plurality of metal mesh sheets overlaid on each other and slidable over each other.

The horizontally long, substantially rectangular mesh member 23 may be provided with the paired bars 22 attached to left and right ends of the mesh member 23, respectively. The paired bars 22 provided at the left and right ends of the horizontally long, substantially rectangular mesh member 23 may project in the up-down directions from the mesh member 23. The upper end and the lower end of each of the paired bars 22 may be fixed to respective receivers 12 provided at the vehicle body 2.

Paired auxiliary panels 24 may be attached to the respective bars 22. The auxiliary panels 24 may extend outwardly from the respective bars 22 in a vehicle width direction. The paired auxiliary panels 24 projecting outwardly from the respective bars 22 may be fixed to the vehicle body 2 with screws or other fixing means.

The pet guard body 21 described above may be attached to the cargo room 4 behind the rear-row seat 7 such that the horizontally long, substantially rectangular mesh member 23 overlaps with a space between the upper edge of the seat back 9 of the rear-row seat 7 and the ceiling of the vehicle body 2. The paired bars 22 may be fixed to the respective receivers 12 provided at the vehicle body 2.

This allows the pet guard body 21 to partition the vehicle compartment into a front portion and a rear portion, i.e., the occupant compartment 3 and the cargo room 4.

Accordingly, the pet placed in the cargo room 4 is prevented from moving forward from the cargo room 4 to the occupant compartment 3. Even if the automobile 1 makes frontal contact, the pet is prevented from being easily thrown forward over the seat back 9 of the rear-row seat 7 toward the occupant compartment 3.

The occupant seated in, for example, the front-row seat 6 is able to visually identify and check the pet placed in the cargo room 4 through the pet guard body 21 in a mesh form by looking back.

The pet placed in the cargo room 4 is able to visually identify the occupant in the occupant compartment 3 through the pet guard body 21 in a mesh form. Further, the pet is able to spend time feeling comfortable in the cargo room 4 without being trapped in a cage narrower than the cargo room 4.

Alternatively, the pet guard body 21 may have a transparent member in place of the mesh member 23. The transparent member may be a resin panel, for example. However, in a case where a resin panel is used as the transparent member, the resin panel may reflect light entering from another vehicle to the vehicle compartment of the automobile 1 while the automobile 1 is traveling. Thus, it is desirable to use the mesh member 23 rather than the transparent member such as the resin panel.

The pet air-bag device 30 may be attached to an upper portion of the pet guard body 21 along an upper edge of the horizontally long, substantially rectangular mesh member 23. That is, the pet air-bag device 30 may be attached to the upper portion of the pet guard body 21 and extend in the left-right direction of the vehicle body 2, i.e., along the width of the vehicle body 2.

Upon contact of the automobile 1, the pet air-bag device 30 of the pet guard apparatus 20 is deployed to prevent the pet in the cargo room 4 from easily and directly hitting against the pet guard body 21. This protects the safety of the pet.

Figure 3:
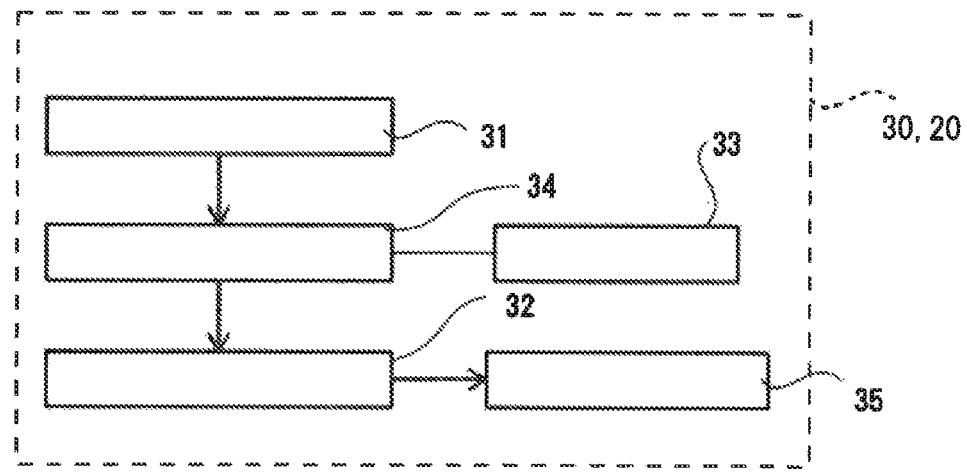
FIG. 3 is a block diagram illustrating an exemplary configuration of a pet air-bag device of the pet guard apparatus illustrated in FIG. 1.

FIG. 3 illustrates an exemplary configuration of the pet air-bag device 30 of the pet guard apparatus 20 illustrated in FIG. 1.

The pet air-bag device 30 illustrated in FIG. 3 may include a device-side acceleration sensor 31, a pet air-bag inflator 32 that deploys a pet air-bag 35, a device-side memory 33, and a setting controller 34 to which the device-side acceleration sensor 31, the pet air-bag inflator 32, and the device-side memory 33 are coupled.

The device-side acceleration sensor 31 may output a detection value to the setting controller 34.

The setting controller 34 may output an operation signal to the pet air-bag inflator 32.

In one embodiment, the setting controller 34 may serve as a "controller".

The device-side acceleration sensor 31 may be an acceleration sensor provided in the pet guard apparatus 20. The device-side acceleration sensor 31 may detect acceleration rates in three axial directions of the automobile 1: the front-back direction, the left-right direction, and the up-down direction of the automobile 1. Alternatively, the device-side acceleration sensor 31 may detect only an acceleration rate in the front-back direction of the automobile 1. The device-side acceleration sensor 31 may output the detection value of a current acceleration rate to the setting controller 34. In one embodiment, the device-side acceleration sensor 31 may serve as a "contact sensor".

The pet air-bag inflator 32 may be ignited to generate a high-pressure gas in response to the operation signal.

The pet air-bag 35 may be coupled to the pet air-bag inflator 32. The pet air-bag 35 may be a bag to be expanded and deployed by the high-pressure gas generated by the pet air-bag inflator 32. When being deployed, the pet air-bag 35 may have a horizontally long, substantially rectangular curtain-shape in a size substantially the same as or greater than the size of the horizontally long, substantially rectangular mesh member 23.

In an ordinary state, for example, the curtain-shaped pet air-bag 35 may be folded and stored in the pet guard apparatus 20 extending along the upper edge of the horizontally long, substantially rectangular mesh member 23.

The device-side memory 33 may store a program or data for control of deploying the pet air-bag 35 to be performed by the pet air-bag device 30. The device-side memory 33 may be a random access memory (RAM), a semiconductor memory, or a hard disk drive (HDD), for example.

The setting controller 34 may be, for example, a CPU. The CPU may execute the program stored in the device-side memory 33. This allows the CPU to serve as the setting controller 34 that controls settings and an overall operation of the pet air-bag device 30.

The setting controller 34 may compare the detection value of an acceleration rate detected by the device-side acceleration sensor 31 with a threshold to detect frontal contact of the automobile 1.

If the detection value detected by the device-side acceleration sensor 31 is greater than the threshold, the setting controller 34 may output the operation signal to the pet air-bag inflator 32.

Figure 4:
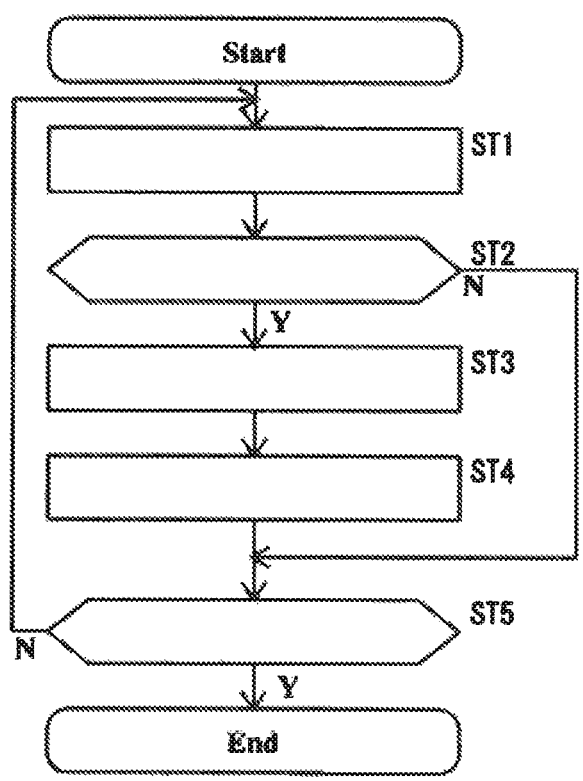
FIG. 4 is a flowchart of pet protection control performed by the pet air-bag device.

FIG. 4 is a flowchart of pet protection control performed by the pet air-bag device 30.

The pet protection control illustrated in FIG. 4 may be repeatedly executed by the setting controller 34.

In Step ST1, the detection value of an acceleration rate may be acquired. For example, the setting controller 34 may acquire a new detection value of an acceleration rate from the device-side acceleration sensor 31.

In Step ST2, the acquired detection value may be compared with a threshold. For example, the setting controller 34 may compare the acquired detection value with the threshold. In this example, the threshold may be used to detect frontal contact (e.g., a frontal collision) of the automobile 1. Alternatively, the setting controller 34 may compare the absolute value of the acquired detection value with the threshold. If the detection value is greater than or equal to the threshold (Step ST2: Y), the setting controller 34 may cause the process to proceed to Step ST3. If the detection value is less than the threshold (Step ST2: N), the setting controller 34 may cause the process to proceed to Step ST5.

In Step ST3, detection of frontal contact (e.g., a frontal collision) of the automobile 1 may be confirmed. For example, the setting controller 34 may start a process to be performed upon frontal contact (e.g., a frontal collision) of the automobile 1.

In Step ST4, the operation signal may be outputted. For example, the setting controller 34 may output the operation signal to the pet air-bag inflator 32.

When the frontal contact of the automobile 1 is detected, the pet air-bag 35 folded and stored in the pet guard apparatus 20 may start deployment downwardly from the upper edge of the pet guard body 21. The pet air-bag 35 may be deployed to entirely cover the mesh member 23 of the pet guard body 21 from behind the mesh member 23. In this case, the pet air-bag 35 may be deployed in a range narrower than the pet guard body 21 in the vehicle width direction.

This prevents the pet from easily hitting strongly or directly against the pet guard body 21 having high rigidity. It is therefore expected that the safety of the pet is enhanced at the time of frontal contact.

In Step ST5, it may be determined whether the control is to be ended. For example, the setting controller 34 may determine whether the pet protection control is to be ended. If the automobile 1 is stopped, for example, the setting controller 34 may determine that the pet protection control is to be ended (Step ST5: Y). If it is determined that the pet protection control is not to be ended (Step ST5: N), the setting controller 34 may cause the process to return to Step ST1.

The setting controller 34 may repeat the procedure including Step ST1 to Step ST5 until it is determined that the pet protection control is to be ended. If it is determined that the pet protection control is to be ended (Step ST5: Y), the setting controller 34 may end the control.

Alternatively, the setting controller 34 may estimate frontal contact of the automobile 1 and output the operation signal to the pet air-bag inflator 32 before the frontal contact of the automobile 1 is detected.

The setting controller 34 may further detect or estimate contact other than the frontal contact of the automobile 1 and output the operation signal to the pet air-bag inflator 32.

As described above, in a case where contact of the automobile 1 is detected or estimated on the basis of the detection by the device-side acceleration sensor 31, the setting controller 34, which serves as a device-side controller, may output the operation signal to the pet air-bag inflator 32.

Figure 5:
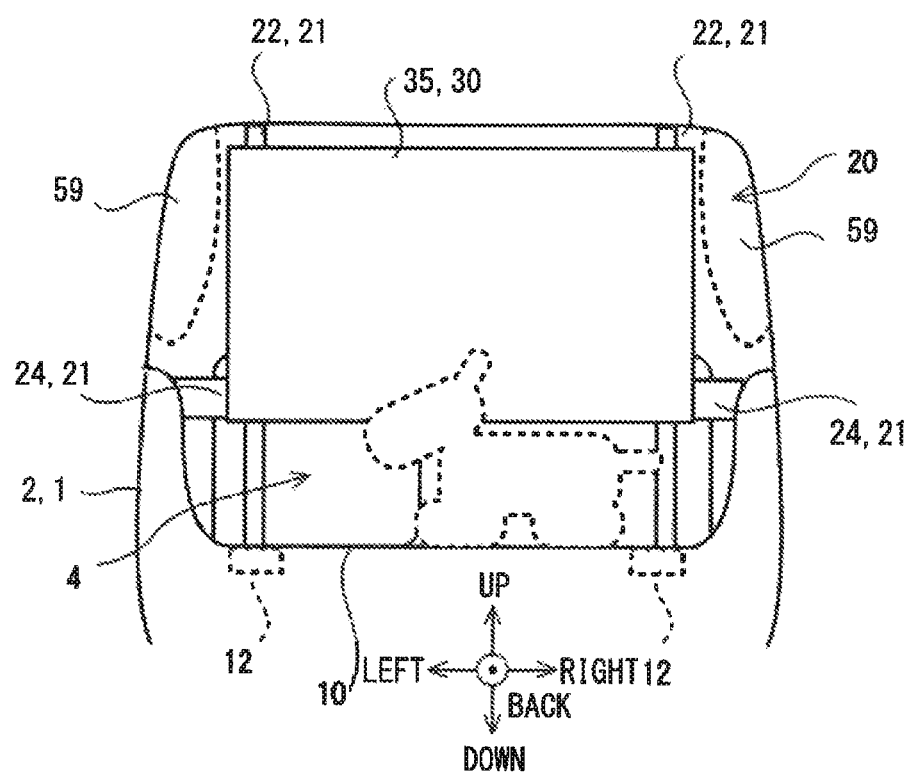
FIG. 5 is an explanatory diagram illustrating a deployed state of the pet air-bag device in the automobile illustrated in FIG. 1.

FIG. 5 illustrates a deployed state of the pet air-bag device 30 in the automobile 1 illustrated in FIG. 1.

FIG. 5 may be associated with FIG. 2.

In FIG. 5, the pet air-bag 35 of the pet air-bag device 30 may be deployed downwardly from the upper edge of the pet guard body 21 to entirely cover the mesh member 23 of the pet guard body 21 from behind the mesh member 23.

The pet air-bag 35 may be deployed within a width range between the deploying regions of the side curtain air-bag devices 59 provided at the left and right sides of the cargo room 4. That is, the pet air-bag 35 may be deployed so as not to interfere with deployment of the side curtain air-bag devices 59 provided at the left and right sides of the cargo room 4. In a case where the automobile 1 does not include the side curtain air-bag devices 59, the pet air-bag 35 may be deployed within the entire width range of the cargo room 4.

The pet air-bag 35 deployed as described above prevents the pet in the cargo room 4 from easily hitting strongly and directly against the pet guard body 21 having high rigidity. It is therefore expected that the safety of the pet is enhanced at the time of front contact.

According to the first example embodiment described above, the pet guard apparatus 20 that protects the pet in the vehicle compartment of the automobile 1 includes the pet guard body 21 and the pet air-bag device 30. The pet guard body 21 may have the mesh form. The pet guard body 21 in the mesh form is attachable to the vehicle compartment of the automobile 1. When being attached to the vehicle compartment of the automobile, the pet guard body 21 extends in the vertical direction in the vehicle compartment to partition the vehicle compartment into the front portion and the rear portion. The pet air-bag device 30 is attached to the pet guard body 21 in the mesh form. The pet air-bag device 30 includes the pet air-bag 35 and the pet air-bag inflator 32. The pet air-bag 35 is configured to be deployed downwardly from the top of the pet guard body 21 and behind the pet guard body 21 in the mesh form. The pet air-bag inflator 32 is operated to deploy the pet air-bag 35 upon contact of the automobile 1.

Further, according to the first example embodiment, the device-side acceleration sensor 31, which serves as the contact sensor, may be provided in the pet guard apparatus 20. The device-side acceleration sensor 31 may detect or estimate contact of the automobile 1. In a case where contact of the automobile 1 is detected or estimated by the device-side acceleration sensor 31, the setting controller 34 may output the operation signal to the pet air-bag inflator 32. Thus, the pet guard apparatus 20 according to the first example embodiment makes it possible to detect contact of the automobile 1 without receiving information on the contact (e.g., frontal contact) from the automobile 1, and deploy the pet air-bag device 30.

In the automobile 1 to which the pet guard apparatus 20 according to the first example embodiment is attached, the pet air-bag inflator 32 may be activated upon contact of the automobile 1. The curtain-shaped pet air-bag 35 may be deployed downwardly from the top of the pet guard body 21 and behind the pet guard body 21. The curtain-shaped pet air-bag 35 may be deployed behind the pet guard body 21 extending in the vertical direction in the vehicle compartment to partition the vehicle compartment of the automobile 1 into the front portion and the rear portion. When being deployed, the curtain-shaped pet air-bag 35 may cover substantially the entirety of the pet guard body 21. When the automobile 1 makes contact, the pet placed in the cargo room 4, which is the rear portion of the vehicle compartment located behind the pet guard body 21, is thrown forward and hits against the curtain-shaped pet air-bag 35. This prevents the pet from easily hitting directly against the pet guard body 21. The pet placed in the vehicle compartment is thereby prevented from being easily thrown forward over the pet guard body 21 and easily hitting strongly against the pet guard body 21. Thus, the pet placed in the vehicle compartment is appropriately protected by the pet guard apparatus 20 according to the first example embodiment.

According to the first example embodiment, the curtain-shaped pet air-bag 35 of the pet guard apparatus 20 may not be deployed while the automobile 1 is traveling in an ordinary state without making contact. During the ordinary traveling, the vehicle compartment of the automobile 1 may be partitioned into the front portion and the rear portion only by the pet guard body 21 in the mesh form. This allows the occupant to visually identify the pet placed in the rear portion of the vehicle compartment through the pet guard body 21, in the mesh form, of the pet guard apparatus 20.

The occupant is thus able to check the state of the pet without stopping the automobile 1 and getting out of the automobile 1 to go to the cargo room 4. Further, the pet is able to move (e.g., sit up) in the rear portion of the vehicle compartment in response to a call from the occupant without being trapped in a cage narrower than the rear portion of the vehicle compartment.

According to the first example embodiment described above, it is possible to enhance the safety of the pet while securing convenience of the occupant of the automobile 1.

Second Example Embodiment

Described next is the automobile 1 to which the pet guard apparatus 20 according to a second example embodiment of the disclosure is attached. In the second example embodiment, some of the functions of the pet guard apparatus 20 according to the foregoing example embodiment may be achieved by the control system 40 of the automobile 1.

The following description focuses on differences from the foregoing example embodiment. Elements having substantially the same function and configuration as those in the foregoing example embodiment are denoted with the same reference numerals to avoid any redundant description.

Figure 6:
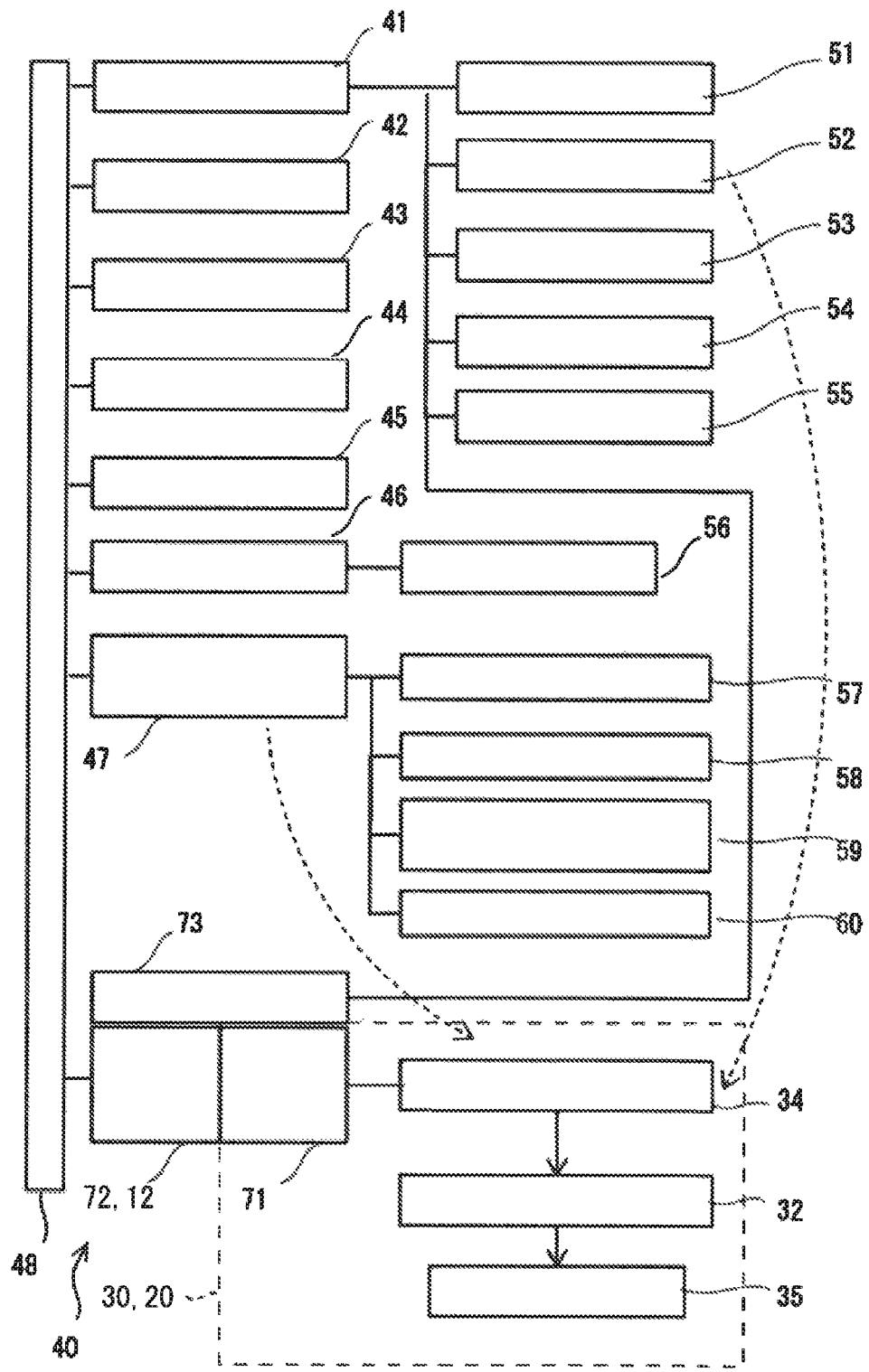
FIG. 6 is a block diagram for explaining an exemplary coupling state between a control system of the automobile and the pet air-bag device according to one example embodiment of the disclosure.

FIG. 6 illustrates an exemplary coupling state between the control system 40 of the automobile 1 and the pet air-bag device 30 according to the second example embodiment of the disclosure.

The pet air-bag device 30 illustrated in FIG. 6 may include a device-side connector 71 in place of the device-side acceleration sensor 31 described in the foregoing example embodiment. In one embodiment, the device-side connector 71 may serve as a "connector". The device-side connector 71 may be coupled to a vehicle-side connector 72 of the control system 40 of the automobile 1. The vehicle-side connector 72 may be provided at the receiver 12. In this case, the device-side connector 71 may be coupled to the vehicle-side connector 72 by attaching the pet guard apparatus 20 to the vehicle body 2. The receiver 12 may be further provided with a coupling sensor 73 that detects coupling and decoupling between the device-side connector 71 and the vehicle-side connector 72. The vehicle-side connector 72 provided at the receiver 12 may be covered by a non-illustrated cover when not in use.

The control system 40 of the automobile 1 illustrated in FIG. 6 may include a central gateway (CGW) 48. To the CGW 48, a vehicle detector 41, a traveling control device 42, an event logger 43, an outside-vehicle communicator 44, an in-vehicle communicator 45, an operation detector 46, an occupant protection control apparatus 47, and the vehicle-side connector 72 may be coupled.

The CGW 48 may control communication among multiple devices provided in the control system 40 of the automobile 1. Each of the devices provided in the control system 40 may be coupled to the CGW 48 with a bus cable. The CGW 48 may control relay of communication data packets from one of the devices to another of the devices. The CGW 48 and the bus cables may constitute a communication network in the automobile 1. The communication network in the automobile 1 may be, for example, a controller area network (CAN).

Various sensors provided in the automobile 1 may be coupled to the vehicle detector 41. In this example embodiment, an outside-vehicle camera 51, a vehicle-side acceleration sensor 52, a cargo room camera 53, a cargo room radar 54, a cargo room weight sensor 55, and the coupling sensor 73 may be coupled to the vehicle detector 41.

The outside-vehicle camera 51 may be disposed so as to face the front in the occupant compartment 3 of the automobile 1. In this case, the outside-vehicle camera 51 may capture an image of a region in front of the automobile 1. The captured image of the region in front of the automobile 1 may include an image of another automobile traveling ahead of the automobile 1. The outside-vehicle camera 51 may be a 360-degree camera. Alternatively, multiple outside-vehicle cameras 51 may be provided in the automobile 1.

The vehicle-side acceleration sensor 52 may detect acceleration generated in the automobile 1. For example, the vehicle-side acceleration sensor 52 may detect acceleration rates in three axial directions of the automobile 1: the front-back direction, the left-right direction, and the up-down direction of the automobile 1.

The cargo room camera 53 may capture an image of the cargo room 4 of the automobile 1. For example, the cargo room camera 53 may capture an image of a baggage or a pet placed in the cargo room 4 at an imaging angle depending on the size or dimensions of the baggage or the pet.

The cargo room radar 54 may scan the cargo room 4 of the automobile 1 with a radar beam. The result of radar scanning performed on the cargo room 4 in which a baggage or a pet is placed may be different from the result of radar scanning performed on the cargo room 4 in which a baggage or a pet is not placed. The cargo room radar 54 may detect the dimensions or size of a region in which such differential data is generated.

The cargo room weight sensor 55 may be provided on the floor 10 of the cargo room 4 of the automobile 1 and detect the weight of a baggage or a pet placed on the floor 10 of the cargo room 4 of the automobile 1.

The vehicle detector 41 may output detection values obtained by these various sensors and values generated on the basis of the detection values to the other devices coupled to the vehicle detector 41 via the CGW 48. Examples of the other devices may include the occupant protection control apparatus 47, and the setting controller 34 in the pet air-bag device 30 coupled to the vehicle detector 41 via the vehicle-side connector 72. For example, the vehicle detector 41 may output the detection value of a current acceleration rate detected by the vehicle-side acceleration sensor 52 to the setting controller 34 with broadcast transmission.

The traveling control device 42 may control traveling of the automobile 1. For example, the traveling control device 42 may control manual driving, driver assistance driving, and automatic driving of the automobile 1 on the basis of a value outputted by the vehicle detector 41.

The occupant protection control apparatus 47 may be an apparatus that protects an occupant in the occupant compartment 3 of the automobile 1. To the occupant protection control apparatus 47, for example, the seatbelt device 57, a front air-bag device 58, the side-curtain air-bag devices 59, and a seat air-bag device 60 may be coupled.

The seatbelt device 57 may hold an occupant seated in the front-row seat 6 or the rear-row seat 7 with a seatbelt.

The front air-bag device 58 may be an air-bag device to be deployed in front of the front-row seat 6.

The side-curtain air-bag devices 59 may be each an air-bag device to be deployed to extend in the front-back direction along a side face of the vehicle compartment.

The seat air-bag device 60 may be an air-bag device to be deployed from a side face of the front-row seat 6.

The occupant protection control apparatus 47 may estimate or detect contact, such as frontal contact, of the automobile 1 on the basis of a value outputted by the vehicle detector 41, for example.

In a case where frontal contact of the automobile 1 is estimated or detected, for example, the occupant protection control apparatus 47 may output the operation signal to the front air-bag device 58 out of the multiple air-bag devices in the automobile 1, to thereby deploy a front air-bag.

In a case where side contact of the automobile 1 is estimated or detected, the occupant protection control apparatus 47 may output the operation signal to each of the side-curtain air-bag devices 59 and the seat air-bag device 60 out of the multiple air-bag devices in the automobile 1, to thereby deploy a side-curtain air-bag and a seat air-bag.

As described above, in a case where contact of the automobile 1 is estimated or detected, the occupant protection control apparatus 47 may output the operation signal to one or more of the air-bag devices provided in an input direction of the contact as seen from the position at which the occupant is seated.

Note that it is difficult for the occupant protection control apparatus 47 to output the operation signal to the pet air-bag device 30 retrofitted to the automobile 1.

Thus, in Step ST1 of FIG. 4, the setting controller 34 of the pet air-bag device 30 may acquire the detection value of an acceleration rate detected by the vehicle-side acceleration sensor 52 from the vehicle detector 41 via the device-side connector 71 and the vehicle-side connector 72.

This allows the setting controller 34 of the pet air-bag device 30 to acquire the detection value of an acceleration rate from the automobile 1 even if the device-side acceleration sensor 31 is not provided in the setting controller 34.

Further, the setting controller 34 may execute the pet protection control illustrated in FIG. 4 to output the operation signal to the pet air-bag inflator 32 in Step ST4. This allows the pet air-bag 35 folded and stored in the pet guard apparatus 20 to be deployed downwardly from the upper edge of the pet guard body 21 when frontal contact of the automobile 1 is detected.

The outside-vehicle communicator 44 may establish a radio communication path to a non-illustrated base station outside the automobile 1. The automobile 1 may send and receive data to/from an outside-vehicle server via the radio communication path to the base station. For example, when an emergency event such as contact of the automobile 1 is detected or estimated, the occupant protection control apparatus 47 may cause the outside-vehicle communicator 44 to send an emergency notification. The outside-vehicle communicator 44 may further establish a radio communication path to another automobile.

The in-vehicle communicator 45 may detect another device, such as a mobile terminal or an IOT device (not illustrated), placed in the vehicle, and may establish a radio communication path to the other device. The in-vehicle communicator 45 may send and receive data to/from the other device, such as a mobile terminal or an IOT device, via the ratio communication path.

The in-vehicle communicator 45 may determine whether the other device is located inside the vehicle or outside the vehicle on the basis of response delay time of the other device. The response delay time of the other device located outside the vehicle may tend to be longer than that of the other device located inside the vehicle.

The operation detector 46 may detect operations performed by the occupant on various user interfaces (UI) or a setting switch 56 that are provided inside the vehicle compartment.

The setting switch 56 may include, for example, a switch to be switched in accordance with the presence or absence of the pet guard apparatus 20 attached to the vehicle compartment, and a switch to be used to set the type or size of a pet to be placed in the cargo room 4.

When an event to be recorded happens in the automobile 1, the event logger 43 may record and accumulate the event in a chronological order. In the event logger 43, event logs of the various operations described above may be recorded.

For example, in the event logger 43, various events including an event about driving generated by the traveling control device 42, an event about contact detection generated by the occupant protection control apparatus 47, and an event about deployment of any air-bag generated by the occupant protection control apparatus 47 may be recorded and accumulated in a chronological order.

According to the second example embodiment described above, the device-side connector 71 of the pet air-bag device 30 in the pet guard apparatus 20 may be coupled to the automobile 1 to receive the signal indicating the detection value of the acceleration rate based on the detection or estimation of contact of the automobile 1. When receiving the signal based on the detection or estimation of contact of the automobile 1 from the automobile 1, the setting controller 34, which serves as the device-side controller, of the pet air-bag device 30 may output the operation signal to the pet air-bag inflator 32. This allows the pet guard apparatus 20 according to the second example embodiment to generate the operation signal on the basis of the detection of contact of the automobile 1 even if the pet guard apparatus 20 does not include the device-side acceleration sensor 31 to detect contact therein. The pet air-bag inflator 32 may be operated to deploy the pet airbag 35 in response to the generated operation signal.

Third Example Embodiment

Described next is the automobile 1 to which the pet guard apparatus 20 according to a third example embodiment of the disclosure is attached. In the third example embodiment, the pet air-bag device 30 of the pet guard apparatus 20 and the automobile 1 may be coupled to each other, as in the example illustrated in FIG. 6. In the third example embodiment, some of the functions of the pet guard apparatus 20 according to the foregoing example embodiments may be further achieved by the control system 40 of the automobile 1.

The following description focuses on differences from the foregoing example embodiments. Elements having substantially the same function and configuration as those in the foregoing example embodiments are denoted with the same reference numerals to avoid any redundant description.

Figure 7:
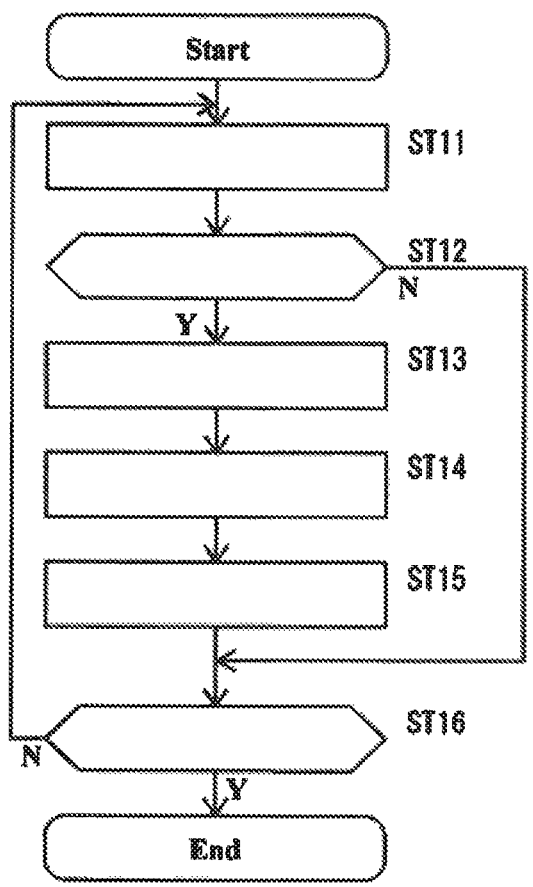
FIG. 7 is a flowchart of occupant protection control performed by the occupant protection control apparatus illustrated in FIG. 6 according to one example embodiment of the disclosure.

FIG. 7 is a flowchart of occupant protection control performed by the occupant protection control apparatus 47 illustrated in FIG. 6 according to the third example embodiment.

In the occupant protection control apparatus 47 of the automobile 1, an occupant protection ECU 82 may execute a program stored in an occupant protection memory 83 to perform the occupant protection control upon contact of the automobile 1, for example. The occupant protection control illustrated in FIG. 7 may be repeatedly executed by the occupant protection ECU 82 as one of the processes of the occupant protection control to be performed by the occupant protection control apparatus 47.

In Step ST11, the detection value of an acceleration rate may be acquired. In one example, the occupant protection ECU 82 of the occupant protection control apparatus 47 may acquire the detection value of the latest acceleration rate of the automobile 1. For example, the occupant protection control apparatus 47 may acquire the detection value of the latest acceleration rate detected by the vehicle-side acceleration sensor 52 from the vehicle detector 41.

In Step ST12, the acquired detection value may be compared with a threshold. For example, the occupant protection control apparatus 47 may compare the acquired detection value of the acceleration rate with the threshold. In this example, the threshold may be used to detect frontal contact (e.g., a frontal collision) of the automobile 1. Alternatively, the occupant protection control apparatus 47 may compare the absolute value of the acquired detection value with the threshold. If the detection value is greater than or equal to the threshold (Step ST12: Y), the occupant protection control apparatus 47 may cause the process to proceed to Step ST13. If the detection value is less than the threshold (Step ST12: N), the setting controller 34 may cause the process to proceed to Step ST16.

In Step ST13, detection of frontal contact (e.g., a frontal collision) of the automobile 1 may be confirmed. For example, the occupant protection control apparatus 47 may start a process to be performed upon frontal contact (e.g., a frontal collision) of the automobile 1.

In Step ST14, the operation signal may be outputted. For example, the occupant protection control apparatus 47 may output the operation signal to each of the seatbelt device 57 and the inflator for the front air-bag device 58.

When the frontal contact of the automobile 1 is detected, the seatbelt device 57 may hold an occupant seated in the front-row seat 6 or the rear-row seat 7 in the seat.

When the frontal contact of the automobile is detected, the front air-bag folded and stored in the front air-bag device 58 may be deployed in front of the front-row seat 6 in which the occupant is seated.

This makes it possible to hold the occupant with a seatbelt and thus prevent the occupant from being easily thrown forward from the front-row seat 6 or the rear-row seat 7 by the shock upon the frontal contact.

Upon the frontal contact of the automobile 1, the upper body of the occupant may move forward even while the occupant is held by the seatbelt. The front air-bag deployed in front of the occupant may receive the upper body of the occupant to absorb the shock.

This makes it possible to protect the occupant from the shock upon the contact.

In Step ST15, a frontal contact detection signal may be outputted. For example, the occupant protection control apparatus 47 may output the frontal contact detection signal to the communication network of the automobile 1. The frontal contact detection signal may be outputted to the setting controller 34 of the pet air-bag device 30 via the CGW 48, the vehicle-side connector 72, and the device-side connector 71.

The frontal contact detection signal sent from the occupant protection control apparatus 47 to the communication network of the automobile 1 may be a dedicated signal directed only to the setting controller 34 of the pet air-bag device 30 or a signal directed to the setting controller 34 and the other devices coupled to the communication network of the automobile 1.

In one example, when contact such as frontal contact of the automobile 1 is detected, the occupant protection control apparatus 47 may output an event log signal to the event logger 43.

In another example, when contact such as frontal contact of the automobile 1 is detected, the occupant protection control apparatus 47 may output an emergency notification signal to the outside-vehicle communicator 44 and the in-vehicle communicator 45.

These signals to be sent to the other devices upon the detection of contact of the automobile 1 may be outputted, as the frontal contact detection signals described above, to the setting controller 34 of the pet air-bag device 30.

The CGW 48 may detect in advance whether the device-side connector 71 has been coupled to the vehicle-side connector 72. When the signals of the detection of contact are outputted to the other devices, the CGW 48 may receive the signals as the frontal contact detection signal, and may output the frontal contact detection signal to the setting controller 34 of the pet air-bag device 30.

In Step ST16, it may be determined whether the control is to be ended. For example, the occupant protection control apparatus 47 may determine whether the occupant protection control is to be ended. If the automobile 1 is stopped, for example, the occupant protection control apparatus 47 may determine that the occupant protection control is to be ended (Step ST16: Y). If it is determined that the occupant protection control is not to be ended (Step S16: N), the occupant protection control apparatus 47 may cause the process to return to Step ST11. The occupant protection control apparatus 47 may repeat the procedure including Step ST11 to Step ST16 until it is determined that the occupant protection control is to be ended. If it is determined that the occupant protection control is to be ended (Step ST16: Y), the occupant protection control apparatus 47 may end the control.

Alternatively, the occupant protection control apparatus 47 may estimate frontal contact of the automobile 1 before the frontal contact of the automobile 1 is detected, and may execute the procedure including Step ST13 to Step ST15 described above.

The occupant protection control apparatus 47 may further detect or estimate contact other than the frontal contact of the automobile 1, and may execute the procedure including Step ST13 to Step ST15.

As described above, in a case where contact of the automobile 1 is detected or estimated on the basis of the detection by the vehicle-side acceleration sensor 52, the occupant protection control apparatus 47 may execute the procedure including Step ST13 to Step ST15.

Figure 8:
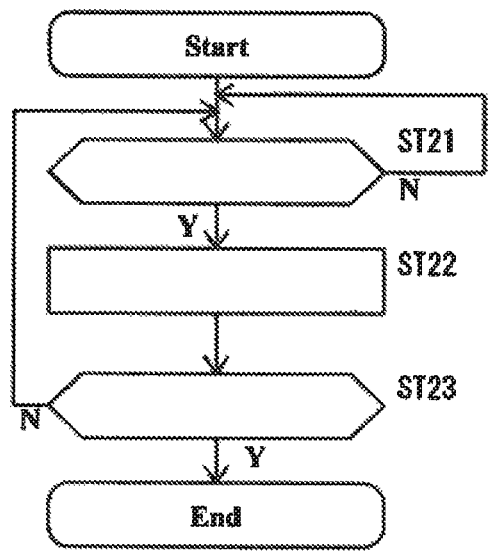
FIG. 8 is a flowchart of pet protection control performed by the pet air-bag device according to one example embodiment of the disclosure, where the flowchart illustrated in FIG. 8 is associated with the flowchart illustrated in FIG. 7.

FIG. 8 is a flowchart of pet protection control performed by the pet air-bag device 30 according to the third example embodiment of the disclosure. The flowchart illustrated in FIG. 8 may be associated with the flowchart illustrated in FIG. 7.

The pet protection control illustrated in FIG. 8 may be repeatedly executed by the setting controller 34 of the pet air-bag device 30.

In Step ST21, it may be determined whether the frontal contact detection signal has been acquired. For example, the setting controller 34 may determine whether the frontal contact detection signal has been acquired from the control system 40 of the automobile 1. If the frontal contact detection signal has not been acquired (ST21: N), the setting controller 34 may repeat Step ST21. If the frontal contact detection signal has been acquired (ST21: Y), the setting controller 34 may cause the procedure to proceed to Step ST22.

In Step ST22, the operation signal may be outputted. For example, the setting controller 34 may start a process to be performed upon frontal contact (e.g., a frontal collision) of the automobile 1, and may output the operation signal to the pet air-bag inflator 32.

When the frontal contact of the automobile 1 is detected, the pet air-bag 35 folded and stored in the pet guard apparatus 20 may start deployment downwardly from the upper edge of the pet guard body 21. The pet air-bag 35 may be deployed to entirely cover the mesh member 23 of the pet guard body 21 from behind the mesh member 23. In this case, the pet air-bag 35 may be deployed in a range narrower than the pet guard body 21 in the vehicle width direction.

This prevents the pet from easily hitting strongly or directly against the pet guard body 21 having high rigidity. It is therefore expected that the safety of the pet is enhanced at the time of frontal contact.

In Step ST23, it may be determined whether the control is to be ended. For example, the setting controller 34 may determine whether the pet protection control is to be ended. If the automobile 1 is stopped, for example, the setting controller 34 may determine that the pet protection control is to be ended (Step ST23: Y). If it is determined that the pet protection control is not to be ended (Step ST23: N), the setting controller 34 may cause the process to return to Step ST21.

The setting controller 34 may repeat the procedure including Step ST21 to Step ST23 until it is determined that the pet protection control is to be ended. If it is determined that the pet protection control is to be ended (Step ST23: Y), the setting controller 34 may end the control.

According to the third example embodiment described above, the device-side connector 71 of the pet air-bag device 30 in the pet guard apparatus 20 may be coupled to the automobile 1 to receive the contact detection signal based on the detection or estimation of contact of the automobile 1. When receiving the contact detection signal from the automobile 1, the setting controller 34, which serves as the device-side controller, of the pet air-bag device 30 may output the operation signal to the pet air-bag inflator 32. This allows the pet guard apparatus 20 according to the third example embodiment to generate the operation signal on the basis of the result of the determination by the occupant protection control apparatus 47 of the automobile 1 and output the operation signal to the pet air-bag inflator 32 to deploy the pet air-bag 35, without performing the determination by the pet guard apparatus 20 itself.

Fourth Example Embodiment

Described next is the automobile 1 to which the pet guard apparatus 20 according to a fourth example embodiment of the disclosure is attached. In the fourth example embodiment, deployment of the pet air-bag 35 may be controlled depending on the size of a pet.

The following description focuses on differences from the foregoing example embodiment. Elements having substantially the same function and configuration as those in the foregoing example embodiments described above are denoted with the same reference numerals to avoid any redundant description.

Figures 9, 10:
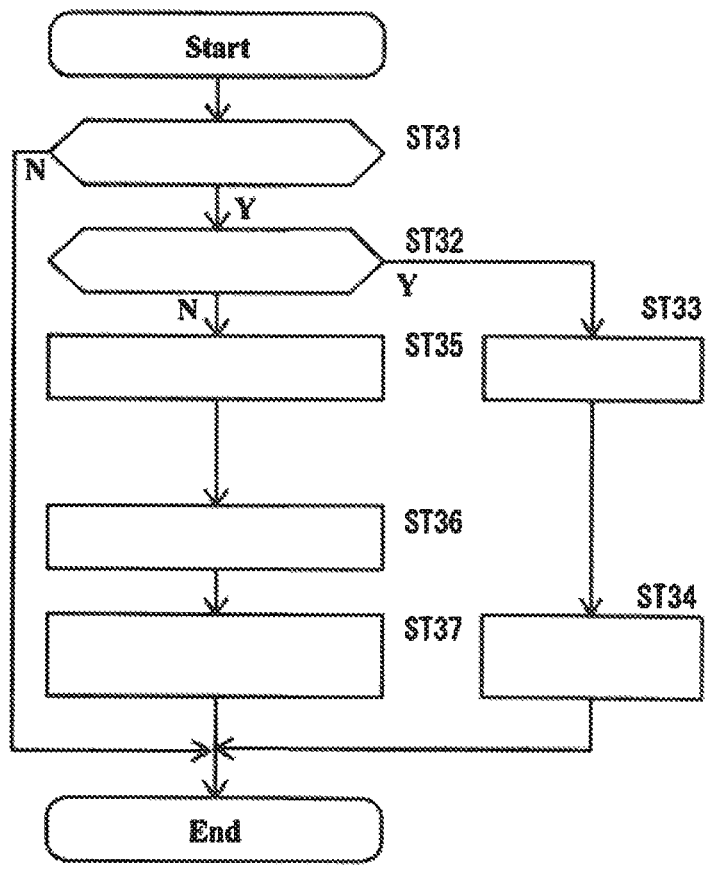
FIG. 9 is a flowchart of pet determination control performed by the pet air-bag device according to one example embodiment of the disclosure.
FIG. 10 is an explanatory diagram illustrating an deployment output setting table used in the pet determination process illustrated in FIG. 9.

FIG. 9 is a flowchart of pet determination control performed by the pet air-bag device 30 according to the fourth example embodiment of the disclosure.

The pet determination control illustrated in FIG. 9 may be repeatedly executed by the setting controller 34 of the pet air-bag device 30.

In Step ST31, it may be determined whether any pet is present in the vehicle compartment. For example, the setting controller 34 may determine whether any pet is loaded on the automobile 1.

The cargo room camera 53 in the control system 40 of the automobile 1 may capture an image of the pet placed in the cargo room 4 of the automobile 1. The size of the pet in the captured image may depend on the actual size of the pet.

The cargo room radar 54 may scan the pet placed in the cargo room 4 of the automobile 1 with a radar beam. The size of the pet included in the result of radar scanning may depend on the actual size of the pet.

The cargo room weight sensor 55 may detect the weight of the pet placed in the cargo room 4 of the automobile 1.

For example, the in-vehicle communicator 45 may detect a non-illustrated IOT device attached to the collar of the pet. The IOT device may include data on the size of the pet.

In a case where pet detection information detected by any of these sensors is acquired from the control system 40 of the automobile 1, the setting controller 34 may determine that a pet is present in the automobile 1 (Step ST31: Y). In this case, the setting controller 34 may cause the process to proceed to Step ST32.

In a case where no pet detection information is detected by any of these sensors, the setting controller 34 may determine that no pet is present in the automobile 1 (Step ST31: N). That is, the setting controller 34 makes it possible to determine the absence of a pet in the automobile 1 even while the pet guard apparatus 20 is attached to the automobile 1. In this case, the setting controller 34 may end the control.

In a case where the vehicle-side connector 72 and the device-side connector 71 are coupled to each other, the coupling sensor 73 may detect the coupling. The setting controller 34 may determine whether the pet guard apparatus 20 is attached to the automobile 1 on the basis of whether the coupling has been detected by the coupling sensor 73.

Alternatively, in a case where the coupling has been detected by the coupling sensor 73, the setting controller 34 may cause the process to proceed to Step ST32 assuming that a pet is present in the automobile 1.

In one embodiment, the cargo-room camera 53, the cargo room radar 54, the in-vehicle communicator 45, and the coupling sensor 73 may serve as a "pet sensor".

In Step ST32, it may be determined whether any setting regarding the pet has been set. For example, the setting controller 34 may determine whether any setting regarding the pet has been set to the control system 40 of the automobile 1.

The control system 40 of the automobile 1 may include, as the setting switch 56 illustrated in FIG. 6, a switch to be switched in accordance with the presence or absence of the pet guard apparatus 20 attached to the vehicle compartment, and a switch to be used to set the type or size of the pet to be placed in the cargo room 4, for example.

In a case where the setting switch 56 is provided or operated, the setting controller 34 may determine that any setting has been set to the control system 40 of the automobile 1 (Step ST32: Y), and may cause the process to proceed to Step ST33.

Otherwise (Step ST32: N), the setting controller 34 may cause the process to proceed to Step ST35.

In Step ST33, the setting regarding the pet may be acquired. For example, the setting controller 34 may acquire the setting value regarding the type or size of the pet set with the setting switch 56 via the operation detector 46.

In Step ST34, an deployment setting may be set on the basis of the acquired setting. In one example, the setting controller 34 may set the deployment setting to deploy the pet air-bag 35 in accordance with the type or size of the pet set with the setting switch 56.

For example, in a case where a large-sized dog has been detected or where a pet size larger than a threshold has been set, the setting controller 34 may set the deployment setting at a high output level, which may be a maximum output level.

In another case where a small-sized dog has been detected or where a pet size smaller than the threshold has been set, the setting controller 34 may set the deployment setting at a low output level, for example.

The pet air-bag 35 deployed by the pet air-bag inflator 32 operating at the low output level may have a hardness lower than the hardness of the pet air-bag 35 deployed by the pet air-bag inflator 32 operating at the maximum output level. Thus, the shock generated when the pet hits against the pet air-bag 35 deployed at the low output level may be lower than the shock generated when the pet hits against the pet air-bag 35 deployed at the maximum output level.

Note that the number of types or sizes of pets, such as dogs, set with the setting switch 56 is not limited to two, and two or more types or sizes of pets, such as dogs, may be set with the setting switch 56. In a case where three or more types or sizes of pets are to be set, the setting controller 34 may switch the output level among, for example, three or more levels depending on the various kinds of settings.

Thereafter, the setting controller 34 may end the process.

In Step ST35, the results of the detection of the pet may be acquired. Since no setting has been set with the setting switch 56, the setting controller 34 may acquire the results of the detection of the pet performed by the sensors. Examples of the results of the detection of the pet may include an image of the cargo room 4 captured by the cargo room camera 53, the result of radar scanning of the cargo room 4 by the cargo room radar 54, the weight acting on the cargo room 4 detected by the cargo room weight sensor 55, and the result of the detection of a predetermined IOT device attached to the collar of the pet by the in-vehicle communicator 45.

In Step ST36, a determination regarding the pet may be performed. For example, the setting controller 34 may determine the size of the pet on the basis of detection information received from the multiple sensors.

In one example, the setting controller 34 may determine the size of the pet by comparing the size or weight of the pet in the pet detection results with a threshold size or a threshold weight.

The setting controller 34 may perform a determination to distinguish between large-sized pets (e.g., large-sized dogs) and small-sized pets (e.g., small-sized dogs) using a predetermined threshold, for example.

In Step ST37, an deployment setting may be set on the basis of the results of determination regarding the pet. In one example, the setting controller 34 may set the deployment setting to deploy the pet air-bag 35 in accordance with the results of determination regarding the pet.

For example, in a case where the size of the pet in the captured image of the cargo room 4 or the result of the radar scanning is greater than or equal to a threshold, or in a case where the weight acting on the cargo room 4 is greater than or equal to a threshold, the setting controller 34 may determine that the pet is a large-sized pet (e.g., a large-sized dog), and may set the deployment setting at the high output level, which may be the maximum output level.

Otherwise, the setting controller 34 may determine that the pet is a small-sized pet (e.g., a small-sized dog), and may set the deployment setting at the low output level.

Further, the setting controller 34 may adjust the determination to distinguish between large-sized pets (e.g., large-sized dogs) and small-sized pets (small-sized dogs) on the basis of data received from a predetermined IOT device attached to the collar of the pet, and may set the deployment setting at an output level appropriate for the result of the adjusted determination.

As described above, the determination regarding the pet may be performed on the basis of the combination of the results of detection obtained by the multiple sensors. Therefore, it is possible to enhance accuracy of the setting controller 34 in performing the determination regarding the pet actually present in the vehicle compartment. This allows for a more probable setting.

According to the fourth example embodiment described above, the setting controller 34 may prioritize the setting set with the setting switch 56 in accordance with the occupant's intention over other settings. In a case where there is no setting set with the setting switch 56 in accordance with the occupant's intention, the setting controller 34 may set an appropriate setting on the basis of the automatic detection of the pet.

Alternatively, unlike in the flowchart described above, the setting controller 34 may set a setting appropriate for the pet on the basis of the combination of the setting set with the setting switch 56 in accordance with the occupant's intention and the setting based on the automatic detection.

FIG. 10 illustrates an deployment output setting table 79 for the pet air-bag device 30. The deployment output setting table 79 may be used in the pet determination process illustrated in FIG. 9.

The deployment output setting table 79 illustrated in FIG. 10 may include pieces of information on the deployment setting depending on the size of a pet, the weight of a pet, and the type of a pet.

The deployment output setting table 79 illustrated in FIG. 10 may be stored in the device-side memory 33.

The setting controller 34 may read the deployment output setting table 79 illustrated in FIG. 10 from the device-side memory 33 in, for example, Step ST36 of FIG. 9, to thereby execute the pet determination.

The setting controller 34 may set the deployment output level on the basis of the deployment output setting table 79 illustrated in FIG. 10 in Step ST34 of FIG. 9.

In the pet determination based on the deployment output setting table 79 illustrated in FIG. 10, the setting controller 34 may first determine the size of the pet present in the cargo room 4 on the basis of the first column of the deployment output setting table 79.

For example, the setting controller 34 may determine the size of the pet by determining whether the size of the pet in the image captured by the cargo room camera 53 or the size of the pet detected by the cargo room radar 54 is greater than or equal to a threshold size for large-sized dogs.

If the size of the pet is greater than or equal to the threshold size for large-sized dogs, the setting controller 34 may determine that the size of the pet present in the cargo room 4 corresponds to the size of a large-sized dog, and may set the deployment setting for large-sized dogs. In Step ST36 in FIG. 9, the setting controller 34 may set a setting for an igniting operation of the pet air-bag inflator 32 so that the pet air-bag 35 will be deployed by the operation of the pet air-bag inflator 32 at the high output level.

In a case where the size of the pet is less than the threshold size for large-sized dogs, the setting controller 34 may then determine the weight of the pet present in the cargo room 4 on the basis of the second column of the deployment output setting table 79.

For example, the setting controller 34 may determine the weight of the pet by determining whether the weight of the pet detected by the cargo room weight sensor 55 is greater than or equal to a threshold weight for large-sized dogs.

If the weight of the pet is greater than or equal to the threshold weight for large-sized dogs, the setting controller 34 may determine that the weight of the pet present in the cargo room 4 corresponds to the weight of a large-sized dog, and may set the deployment setting for large-sized dogs. In Step ST36 of FIG. 9, the setting controller 34 may set the setting for an igniting operation of the pet air-bag inflator 32 so that the pet air-bag 35 will be deployed by the operation of the pet air-bag inflator 32 at the high output level.

If the weight of the pet is less than the threshold weight for large-sized dogs, the setting controller 34 may determine the type of the pet on the basis of the third column of the deployment output setting table 79.

The setting controller 34 may determine whether the type of the pet present in the cargo room 4 is a large-sized dog on the basis of the pet information registered in an IOT device attached to the collar of the pet. The pet information registered in the IOT device may include data on the type, size, and weight of the pet.

If the type of the pet is a large-sized dog, the setting controller 34 may determine that the pet present in the cargo room 4 is a large-sized dog, and may set the deployment setting for large-sized dogs. In Step ST36 of FIG. 9, the setting controller 34 may set the setting for an igniting operation of the pet air-bag inflator 32 so that the pet air-bag 35 will be deployed by the operation of the pet air-bag inflator 32 at the high output level.

If the type of the pet is not a large-sized dog, the setting controller 34 may determine that the pet present in the cargo room 4 is a small-sized dog, and may set the deployment setting for small-sized dogs, as given in the fourth column of the deployment output setting table 79. In Step ST36 of FIG. 9, the setting controller 34 may set the setting for an igniting operation of the pet air-bag inflator 32 so that the pet air-bag 35 will be deployed by the operation of the pet air-bag inflator 32 at the low output level, which may be half the maximum output level of the pet air-bag inflator 32.

Thereafter, the setting controller 34 may execute the pet protection control with the output level of the pet air-bag inflator 32 being set at a level based on the size of the pet. The pet protection control executed in this example may be the one described in the first example embodiment with reference to FIG. 4, the one described in the second example embodiment, or the one described in the third example embodiment with reference to FIG. 8.

When frontal contact (e.g., a frontal collision) of the automobile 1 is detected, the setting controller 34 may cause the pet air-bag inflator 32 to operate at the set output level.

For example, if the deployment setting at the high output level is set on the basis of the first to third columns of the deployment output setting table 79 illustrated in FIG. 10, the pet air-bag inflator 32 may deploy the pet air-bag 35 at the high output level. The pet air-bag 35 deployed at the high output level is able to appropriately receive a heavy, large-sized dog thrown forward upon contact of the automobile 1 to prevent the dog from hitting strongly against the pet guard body 21.

In contrast, in a case where the deployment setting at the low output level is set on the basis of the fourth column of the deployment output setting table 79 illustrated in FIG. 10, the pet air-bag inflator 32 may deploy the pet air-bag 35 at the low output level. The pet air-bag 35 deployed at the low output level has an appropriate hardness not larger than necessary and is able to appropriately receive a relatively light, small-sized dog thrown forward upon contact of the automobile 1.

Note that the level of the deployment output of the pet air-bag inflator 32 may be switched among three or more levels.

According to the fourth example embodiment described above, the setting controller 34 of the pet air-bag device 30 may determine the size of the pet present in the vehicle compartment of the automobile 1. In one embodiment, the setting controller 34 may serve as a "pet determination unit". The pet air-bag inflator 32 may deploy the pet air-bag 35 into different states depending on the result of the determination regarding the size of the pet by the setting controller 34.

For example, in a case where a heavy, large-sized pet, such as a large-sized dog, is present in the cargo room 4, the pet air-bag inflator 32 may deploy the pet air-bag 35 at the high output level. The pet air-bag 35 deployed at the high output level is able to appropriately receive the large-sized pet.

In another case where a light, small-sized pet, such as a small-sized dog, is present in the cargo room 4, for example, the pet air-bag inflator 32 may deploy the pet air-bag 35 at the low output level. The pet air-bag 35 deployed at the low output level has an appropriate hardness not larger than necessary and is able to appropriately receive the small-sized pet. If the pet air-bag 35 is deployed to have a hardness similar to the hardness to receive a large-sized pet despite that a small-sized pet has been detected in the vehicle compartment of the automobile 1, the small-sized pet may hit against the pet air-bag 35 having high hardness with a large shock.

Fifth Example Embodiment

Described next is the automobile 1 to which the pet guard apparatus 20 according to a fifth example embodiment of the disclosure is attached. The fifth example embodiment may be appropriately adopted to the automobile 1 including the side-curtain air-bag devices 59.

The following description focuses on differences from the foregoing example embodiments. Elements having substantially the same function and configuration as those in the foregoing example embodiments are denoted with the same reference numerals to avoid any redundant description.

When being attached to the automobile 1 including the side-curtain air-bag devices 59, the mesh member 23 of the pet guard body 21 of the pet guard apparatus 20 may be disposed so as not to overlap with the deploying regions of the side-curtain air-bag devices 59. As illustrated in FIG. 2, the mesh member 23 may be adjusted to a width smaller than the width of the cargo room 4 so as not to cover the deploying regions of the side-curtain air-bag devices 59 provided at the left and right sides of the vehicle compartment. As illustrated in FIG. 5, the pet air-bag 35 of the pet air-bag device 30 may be adjusted to a width smaller than the width of the cargo room 4 so as not to cover the deploying regions of the side-curtain air-bag devices 59 provided at the left and right sides of the vehicle compartment.

Figure 11:
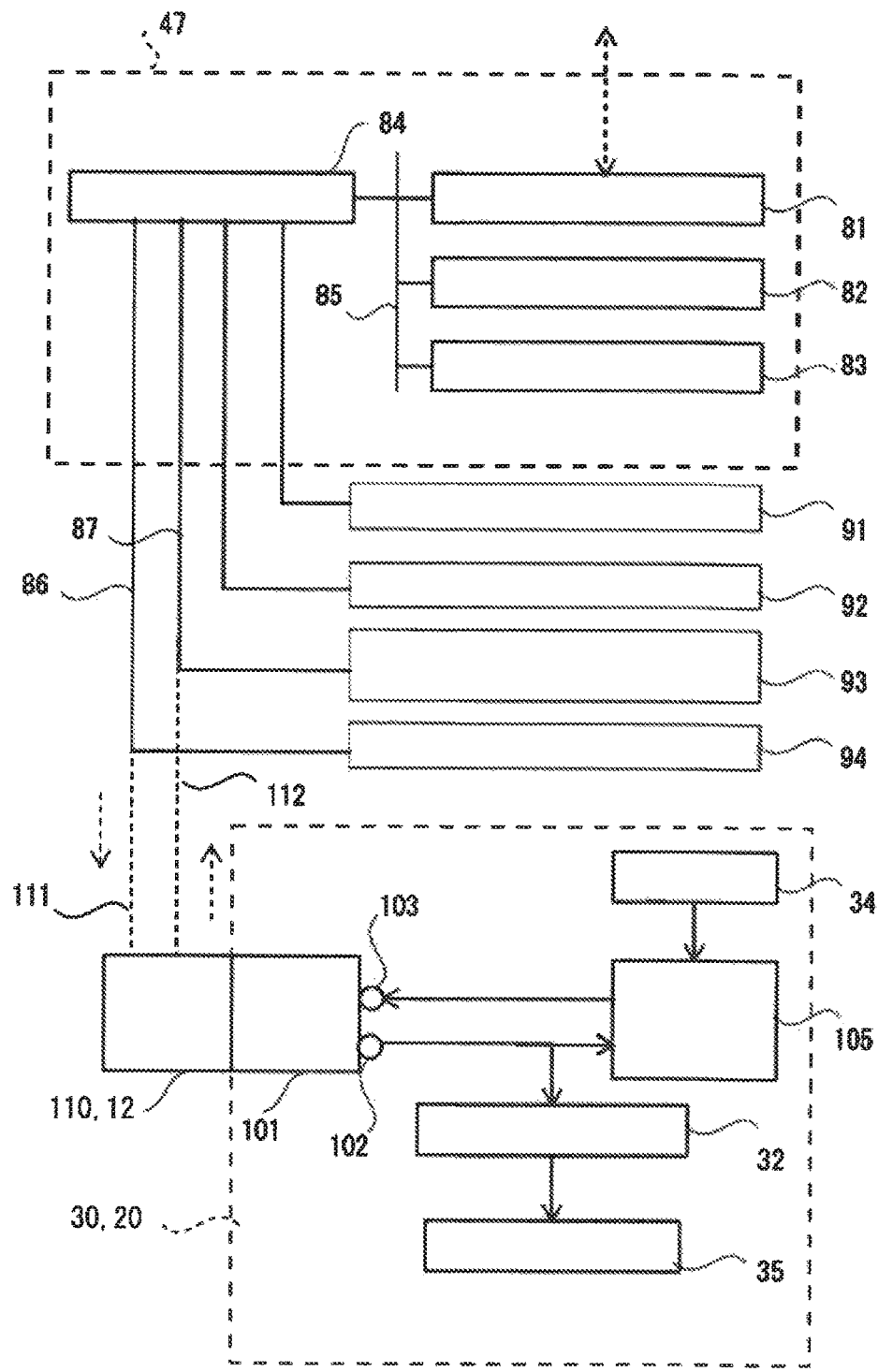
FIG. 11 is an explanatory diagram illustrating an exemplary state of coupling between the occupant protection control apparatus and the pet air-bag device according to one example embodiment of the disclosure.

FIG. 11 illustrates an exemplary coupling state between the occupant protection control apparatus 47 and the pet air-bag device 30 according to the fifth example embodiment of the disclosure.

The occupant protection control apparatus 47 illustrated in FIG. 11 may include an occupant protection communicator 81, the occupant protection ECU 82, the occupant protection memory 83, an occupant protection input-output port 84, and an internal bus 85 that couples these devices to each other for data input and data output.

Various devices provided in the automobile 1 to protect an occupant or a passenger may be coupled to the occupant protection input-output port 84. In this example, a seatbelt actuator 91 for the seatbelt device 57 illustrated in FIG. 6, a front air-bag inflator 94 for the front air-bag device 58 illustrated in FIG. 6, a side-curtain air-bag inflator 93 for the side-curtain air-bag devices 59 illustrated in FIG. 6, and a seat air-bag inflator 92 for the seat air-bag device 60 illustrated in FIG. 6 may be separately coupled to the occupant protection input-output port 84.

The occupant protection communicator 81 may be coupled to the CGW 48 illustrated in FIG. 6 with a bus cable. The occupant protection communicator 81 in the occupant protection control apparatus 47 may control data communication with the other devices coupled to the CGW 48.

The occupant protection memory 83 may store a program or data for the occupant protection control. The occupant protection memory 83 may be a RAM, a semiconductor memory, or a HDD, for example.

The occupant protection ECU 82 may read the program from the occupant protection memory 83 and execute the program. The occupant protection ECU 82 may thereby serve as an occupant protection controller that controls an overall operation of the occupant protection control apparatus 47.

For example, the occupant protection ECU 82 may estimate and detect contact of the automobile 1 on the basis of various detection values and a captured image received from the vehicle detector 41.

The occupant protection ECU 82 may then select, at the occupant protection input-output port 84, an output destination of an operation signal on the basis of the form of the contact estimated or detected, and may output the operation signal to an occupant protection device selected as the output destination.

For example, in a case where frontal contact of the automobile 1 is estimated or detected, the occupant protection ECU 82 may select the seatbelt actuator 91 and the front air-bag inflator 94 as the output destinations, and may output the operation signal to each of the selected output destinations. In the case of the frontal contact, the occupant protection ECU 82 may not output the operation signal to each of the side-curtain air-bag inflator 93 and the seat air-bag inflator 92.

In another case where side contact of the automobile 1 is estimated or detected, for example, the occupant protection ECU 82 may select the seatbelt actuator 91, the side-curtain air-bag inflator 93, and the seat air-bag inflator 92 as the output destinations, and may output the operation signal to each of the selected output destinations. In the case of side contact, the occupant protection ECU 82 may not output the operation signal to the front air-bag inflator 94.

The pet air-bag device 30 illustrated in FIG. 11 may include a device-side connector 101, the pet air-bag inflator 32 that deploys the pet air-bag 35, the device-side memory 33 (not illustrated in FIG. 11), the setting controller 34, and a relay circuit 105.

When receiving a signal, the relay circuit 105 may output the same signal. When receiving no signal, the relay circuit 105 may output no signal.

The relay circuit 105 may be coupled to an input terminal 102 of the device-side connector 101 and an output terminal 103 of the device-side connector 101. In addition, the pet air-bag inflator 32 may also be coupled to the input terminal 102 of the device-side connector 101.

In the fifth example embodiment, the vehicle-side connector 72 of the automobile 1 may be coupled to the occupant protection input-output port 84.

For example, the vehicle-side connector 72 may be coupled to an operation signal line 86 with an auxiliary signal line 111. The operation signal line 86 may couple the occupant protection input-output port 84 to the front air-bag inflator 94. The vehicle-side connector 72 may also be coupled to an operation signal line 87 with an auxiliary signal line 112. The operation signal line 87 may couple the occupant protection input-output port 84 to the side-curtain air-bag inflator 93. The operation signal lines 86 and 87 may be signal lines to transmit the operation signals that cause the occupant protection devices in the automobile 1 to operate on the basis of the detection or estimation of contact of the automobile 1.

Thus, the input terminal 102 of the device-side connector 101 coupled to the pet air-bag inflator 32 of the pet air-bag device 30 may be coupled to the operation signal line 86 coupled to the front air-bag inflator 94 via the vehicle-side connector 72 and the auxiliary signal line 111.

Further, the output terminal 103 of the device-side connector 101 coupled to the pet air-bag inflator 32 of the pet air-bag device 30 may be coupled to the operation signal line 87 coupled to the side-curtain air-bag inflator 93 via the vehicle-side connector 72 and the auxiliary signal line 112.

As described above, the occupant protection control apparatus 47 in the automobile 1 and the pet air-bag device 30 may be coupled to each other. This makes it possible to cause the front air-bag device 58 and the side-curtain air-bag devices 59 provided in the automobile 1 and the pet air-bag device 30 attached to the vehicle body 2 to operate in cooperation with each other at high speed in a short time.

For example, when frontal contact of the automobile 1 is detected, the occupant protection ECU 82 may select, at the occupant protection input-output port 84, the seatbelt actuator 91 and the front air-bag inflator 94 as the output destinations, and may output the operation signal to each of the selected output destinations.

The operation signal outputted from the occupant protection ECU 82 via the occupant protection input-output port 84 may be sent to the front air-bag inflator 94 through the operation signal line 86. This causes the front air-bag device 58 to deploy.

The operation signal sent from the occupant protection input-output port 84 through the operation signal line 86 to the front air-bag inflator 94 may be sent to the device-side connector 101 of the pet air-bag device 30 through the auxiliary signal line 111. The device-side connector 101 may be coupled to the pet air-bag inflator 32. The pet air-bag inflator 32 may be coupled to the device-side connector 101. The pet air-bag inflator 32 may be operated to deploy the pet air-bag 35 in response to the operation signal generated in the automobile 1 and sent to the device-side connector 101. The pet air-bag device 30 may be deployed substantially at the same time as the front air-bag device 58. In this case, the pet air-bag inflator 32 may deploy the pet air-bag 35 at the maximum output level or the low output level in accordance with the deployment setting based on the determination regarding the size of the pet.

The pet air-bag inflator 32 and the relay circuit 105 may be coupled to the input terminal 102 of the device-side connector 101. When receiving the operation signal, the relay circuit 105 may output an auxiliary operation signal to the output terminal 103 of the device-side connector 101. The auxiliary operation signal may be the same as the operation signal. The output terminal 103 of the device-side connector 101 may be coupled to the operation signal line 87 that couples the occupant protection input-output port 84 and the side-curtain air-bag inflator 93 via the vehicle-side connector 72 of the automobile 1 and the auxiliary signal line 112. The auxiliary operation signal outputted from the relay circuit 105 may be sent to the side-curtain air-bag inflator 93 via the output terminal 103 of the device-side connector 101. This causes the side-curtain air-bag devices 59 to deploy. In one embodiment, the side-curtain air-bag devices 59 may serve as a "second air-bag device" of the automobile 1.

Such cooperation described above allows the side-curtain air-bag devices 59 to operate in cooperation with the pet air-bag device 30 and deploy substantially at the same time as the pet air-bag device 30 upon frontal contact of the automobile 1.

Upon the frontal contact of the automobile 1, the side-curtain air-bag devices 59 may not be selected as the output destinations by the occupant protection ECU 82, and the operation signal may not be sent from the occupant protection input-output port 84 to the side-curtain air-bag devices 59. However, the side-curtain air-bag devices 59 is able to deploy in cooperation with the pet air-bag device 30.

Accordingly, as illustrated in FIG. 5, the paired side-curtain air-bag devices 59 provided at the left and right sides of the vehicle compartment are able to cover the gaps between the pet air-bag 35 of the pet air-bag device 30 in the deployed state and the left and right sides of the vehicle compartment. This prevents the pet from easily passing through the gaps.

According to the fifth example embodiment described above, the device-side connector 101 of the pet guard apparatus 20 may have the input terminal 102. To the input terminal 102, the operation signal line 86 of the automobile 1 may be coupled. The operation signal line 86 may transmit the operation signal that causes the front air-bag device 58 of the automobile 1 to operate on the basis of the detection or estimation of contact of the automobile 1. The pet air-bag inflator 32 may be coupled to the device-side connector 101. This allows the pet air-bag inflator 32 to operate and deploy the pet air-bag 35 in response to the operation signal generated in the automobile 1 and sent to the device-side connector 101.

Further, according to the fifth example embodiment, the device-side connector 101 may have the output terminal 103. When the pet air-bag inflator 32 is operated, the auxiliary operation signal may be sent via the output terminal 103 to the side-curtain air-bag devices 59 of the automobile 1. This allows the side-curtain air-bag devices 59 of the automobile 1 to deploy in cooperation with deployment of the pet air-bag device 30 of the pet guard apparatus 20.

The foregoing example embodiments are mere examples of the embodiments of the disclosure, and the disclosure is not limited to the foregoing example embodiments. Various changes or modifications may be made without departing from the gist of the disclosure.

In the foregoing example embodiments, the pet air-bag device 30 includes the single pet air-bag 35; however, the pet air-bag device 30 may include a plurality of pet air-bags 35 arranged in the vertical direction in the automobile 1. The pet air-bags 35 may all be coupled to a common pet air-bag inflator 32, or may be coupled to respective pet air-bag inflators 32. The setting controller 34 of the pet air-bag device 30 may select one or more of the pet air-bags 35 to be deployed on the basis of the size of the pet, for example.

In the foregoing example embodiments, the pet air-bag device 30 is provided in the vehicle compartment and attached to the vehicle body 2 of the automobile 1. The pet air-bag device 30 may be detachably attached to the vehicle body 2 of the automobile 1 or may be fixedly attached to the vehicle body 2 so as not to easily detach from the vehicle body 2. The pet air-bag device 30 may be manufactured or sold together with the automobile 1 or separately from the automobile 1.

The invention claimed is:

1. A pet guard apparatus to be applied to a vehicle, the pet guard apparatus comprising:
  a pet guard body attachable to a vehicle compartment of the vehicle in which a pet is to be placed in such a manner that the pet guard body extends in a vertical direction from a floor of a cargo room to a ceiling of the cargo room in the vehicle compartment to partition the vehicle compartment into a front portion and a rear portion; and
  a first air-bag device attached to the pet guard body, wherein
  the first air-bag device comprises
    a pet air-bag configured to be deployed behind the pet guard body,
    a pet air-bag inflator configured to be operated to deploy the pet air-bag upon contact of the vehicle,
    a contact sensor connected to or provided in the pet guard apparatus, the contact sensor configured to perform detection or estimation of the contact of the vehicle, and
    a controller configured to output an operation signal to the pet air-bag inflator in a case where the contact of the vehicle is detected or estimated by the contact sensor.

2. The pet guard apparatus according to claim 1, wherein
  the first air-bag device comprises a connector configured to be coupled to the vehicle and receive a signal based on the detection or the estimation of the contact of the vehicle performed at the vehicle, and
  the controller is configured to output the operation signal to the pet air-bag inflator in a case where the connector receives the signal based on the detection or the estimation of the contact of the vehicle from the vehicle.

3. The pet guard apparatus according to claim 2, further comprising a pet determination unit configured to perform a determination regarding the pet present in the vehicle compartment of the vehicle on a basis of a result of detection performed by a pet sensor provided in the pet guard apparatus or the vehicle, wherein
  the pet air-bag inflator is configured to deploy the pet air-bag variably depending on a result of the determination performed by the pet determination unit.

4. The pet guard apparatus according to claim 2, further comprising a pet determination unit configured to perform a determination regarding the pet present in the vehicle compartment of the vehicle on a basis of a setting regarding the pet set to the pet guard apparatus or the vehicle, wherein the pet air-bag inflator is configured to deploy the pet air-bag variably depending on a result of the determination performed by the pet determination unit.

5. The pet guard apparatus according to claim 1, wherein the first air-bag device comprises a connector configured to be coupled to an operation signal line of the vehicle, the operation signal line being configured to transmit the operation signal generated at the vehicle on a basis of the detection or the estimation of the contact of the vehicle, and
the pet air-bag inflator is coupled to the connector and configured to be operated to deploy the pet air-bag when receiving the operation signal generated at the vehicle and sent via the connector.

6. The pet guard apparatus according to claim 5, wherein the connector comprises an output terminal through which an auxiliary operation signal is outputted to a second air-bag device of the vehicle when the pet air-bag inflator is operated.

7. The pet guard apparatus according to claim 5, further comprising a pet determination unit configured to perform a determination regarding the pet present in the vehicle compartment of the vehicle on a basis of a result of detection performed by a pet sensor provided in the pet guard apparatus or the vehicle, wherein
the pet air-bag inflator is configured to deploy the pet air-bag variably depending on a result of the determination performed by the pet determination unit.

8. The pet guard apparatus according to claim 5, further comprising a pet determination unit configured to perform a determination regarding the pet present in the vehicle compartment of the vehicle on a basis of a setting regarding the pet set to the pet guard apparatus or the vehicle, wherein
the pet air-bag inflator is configured to deploy the pet air-bag variably depending on a result of the determination performed by the pet determination unit.

9. The pet guard apparatus according to claim 1, further comprising a pet determination unit configured to perform a determination regarding the pet present in the vehicle compartment of the vehicle on a basis of a result of detection performed by a pet sensor provided in the pet guard apparatus or the vehicle, wherein
the pet air-bag inflator is configured to deploy the pet air-bag variably depending on a result of the determination performed by the pet determination unit.

10. The pet guard apparatus according to claim 1, further comprising a pet determination unit configured to perform a determination regarding the pet present in the vehicle compartment of the vehicle on a basis of a setting regarding the pet set to the pet guard apparatus or the vehicle, wherein
the pet air-bag inflator is configured to deploy the pet air-bag variably depending on a result of the determination performed by the pet determination unit.

11. A vehicle to which the pet guard apparatus comprising the first air-bag device according to claim 1 is attached, wherein the first air-bag device of the pet guard apparatus is configured to be deployed upon the contact of the vehicle.

12. The pet guard apparatus according to claim 1, wherein the pet air-bag is configured to be deployed to avoid interference with deployment of side curtain air-bag devices provided at the left and right sides of the vehicle compartment comprising the cargo room where the pet guard body is disposed, and when the vehicle does not include the side curtain air-bag devices, the pet air-bag is configured to be deployed within an entire width range of the cargo room.

13. The pet guard apparatus according to claim 1, wherein the pet guard body includes a section providing a view of the pet by a driver or passenger of the vehicle.

14. The pet guard apparatus according to claim 1, wherein the first air-bag comprise a curtain-shaped air-bag configured to be deployed downwardly from atop a top of the pet guard body and behind the pet guard body.

15. The pet guard apparatus according to claim 1, wherein the first air-bag device is directly connected to the pet guard body.

16. A guard apparatus to be applied to a vehicle, the guard apparatus comprising:
a guard body configured to attachable and detachable to a vehicle compartment of the vehicle in such a manner that the guard body extends in a vertical direction from a floor of a cargo room to a ceiling of the cargo room in the vehicle compartment to partition the vehicle compartment into a front portion and a rear portion; and
a first air-bag device attached to the guard body, wherein the first air-bag device comprises
an air-bag configured to be deployed behind the guard body,
an air-bag inflator configured to be operated to deploy the air-bag upon contact of the vehicle,
a contact sensor connected to or provided in the pet guard apparatus, the contact sensor configured to perform detection or estimation of the contact of the vehicle, and
a controller configured to output an operation signal to the air-bag inflator in a case where the contact of the vehicle is detected or estimated by the contact sensor.

17. The guard apparatus according to claim 16, wherein the first air-bag device comprises a connector configured to be coupled to the vehicle and receive a signal based on the detection or the estimation of the contact of the vehicle performed at the vehicle, and
the controller is configured to output the operation signal to the air-bag inflator in a case where the connector receives the signal based on the detection or the estimation of the contact of the vehicle from the vehicle.

18. The guard apparatus according to claim 16, wherein the first air-bag device comprises a connector configured to be coupled to an operation signal line of the vehicle, the operation signal line being configured to transmit the operation signal generated at the vehicle on a basis of the detection or the estimation of the contact of the vehicle, and
the air-bag inflator is coupled to the connector and configured to be operated to deploy the air-bag when receiving the operation signal generated at the vehicle and sent via the connector.

19. The guard apparatus according to claim 16, further comprising a determination unit configured to perform a determination regarding an animal present in the vehicle compartment of the vehicle on a basis of a result of detection performed by an animal sensor provided in the guard apparatus or the vehicle, wherein
the air-bag inflator is configured to deploy the air-bag variably depending on a result of the determination performed by the determination unit.

20. The guard apparatus according to claim 16, wherein the first air-bag device is directly connected to the guard body.

* * * * *